(12) United States Patent
Nakajima (10) Patent No.: US 10,140,022 B2
(45) Date of Patent: Nov. 27, 2018

(54) METHOD AND APPARATUS OF SUBSIDIARY VOLUME MANAGEMENT

(71) Applicant: Hitachi, Ltd., Tokyo (JP)

(72) Inventor: Akio Nakajima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 109 days.

(21) Appl. No.: 15/110,950

(22) PCT Filed: Jun. 9, 2014

(86) PCT No.: PCT/US2014/041488
§ 371 (c)(1),
(2) Date: Jul. 12, 2016

(87) PCT Pub. No.: WO2015/191023
PCT Pub. Date: Dec. 17, 2015

(65) Prior Publication Data
US 2017/0206021 A1    Jul. 20, 2017

(51) Int. Cl.
*G06F 12/00* (2006.01)
*G06F 3/06* (2006.01)
*G06F 9/455* (2018.01)
*G06F 17/30* (2006.01)

(52) U.S. Cl.
CPC .......... *G06F 3/0608* (2013.01); *G06F 3/0631* (2013.01); *G06F 3/0644* (2013.01); *G06F 3/0653* (2013.01); *G06F 3/0664* (2013.01); *G06F 3/0683* (2013.01); *G06F 9/455* (2013.01); *G06F 9/45558* (2013.01); *G06F 17/30* (2013.01); *G06F 2009/45579* (2013.01); *G06F 2009/45583* (2013.01)

(58) Field of Classification Search
CPC ....................................................... G06F 9/5077
See application file for complete search history.

(56) References Cited

U.S. PATENT DOCUMENTS

| | | | |
|---|---|---|---|
| 9,778,852 B1 * | 10/2017 | Marshak | G06F 3/0611 |
| 2013/0054888 A1 | 2/2013 | Bhat et al. | |
| 2013/0054932 A1 | 2/2013 | Acharya et al. | |
| 2013/0097377 A1 | 4/2013 | Satoyama et al. | |
| 2013/0326058 A1 | 12/2013 | Brady et al. | |

OTHER PUBLICATIONS

International Search Report of PCT/US2014/041488 dated Oct. 22, 2014.

* cited by examiner

*Primary Examiner* — Reginald Bragdon
*Assistant Examiner* — Hannah A Faye-Joyner
(74) *Attorney, Agent, or Firm* — Mattingly & Malur, PC (57) ABSTRACT

Exemplary embodiments provide subsidiary volume management. In one embodiment, a storage system comprises: a memory being operable to store information of a plurality of logical unit groups, each of the plurality of logical unit groups including information of an administrative logical unit (LU) and information of one or more subsidiary LUs to be accessed from a virtual machine on a computer; and a controller being operable to create or select an administrative LU and to inform the computer of the created or selected administrative LU according to evaluation of a subsidiary LU which relates to another administrative LU, when the controller receives a command from the computer to said another administrative LU.

19 Claims, 11 Drawing Sheets

Logical Unit table 50

| Logical Unit Number ~51 | Pool ID ~52 | LU Type ~53 | Admin LUN ~54 | Bind/Unbind ~55 | Capacity ~56 |
|---|---|---|---|---|---|
| 0000 | 1 | Normal | N/A | N/A | 50GB |
| 0001 | 2 | Admin | N/A | N/A | N/A |
| 0002 | 2 | Subsidiary | 0001 | unbind | 100GB |
| 0003 | 3 | Admin | N/A | N/A | N/A |
| 0004 | 3 | Subsidiary | 0003 | bind | 100GB |
| ... | ... | ... | ... | ... | ... |

FIG. 5

Pool Resource Table 60

| Pool ID (61) | Media (62) | capacity (63) | remain capacity (64) |
|---|---|---|---|
| 1 | Flash | 1TB | 0.4TB |
| | SAS | 10TB | 3.5 TB |
| | NL-SAS/SATA | 50TB | 31 TB |
| ... | ... | ... | ... |

FIG. 6

Performance monitoring table 70

| Pool ID | LUN | capacity | Throughput | IOPS |
|---|---|---|---|---|
| 71 | 72 | 73 | 74 | 75 |
| 0 | 0000 | 100GB | 100 MB/s | 620 IOPS |
| | 0002 | 100GB | 50 MB/s | 60 IOPS |
| | 0004 | 100GB | 70 MB/s | 250 IOPS |
| ... | ... | ... | ... | ... |

FIG. 7

Quality of Service table 80

| Pool ID (81) | LUN (82) | QOS group (83) | Throughput threshold (84) | IOPS threshold (85) |
|---|---|---|---|---|
| 0 | 0000 | 1 | 100 MB/s | 1000 IOPS |
|  | 0002 | 1 | 30 MB/s | 500 IOPS |
|  | 0004 | 2 | 200 MB/s | 500 IOPS |
| ... | ... | ... | ... | ... |

METHOD AND APPARATUS OF SUBSIDIARY VOLUME MANAGEMENT

BACKGROUND OF THE INVENTION

The present invention relates generally to computer systems, storage systems, server virtualization, and storage volume virtualization. More particularly, it relates to subsidiary volume management.

According to the latest SCSI (Small computer system interface) specification, a LU (Logical Unit) Group is defined. The LU Group has one administrative LU and multiple subsidiary LUs. A conventional LU contains the LU Group which has many subsidiary LUs. The administrative LU of the LU Group is management LU to create, delete, migrate, or control subsidiary LUs in the LU Group.

The current storage system does not have a functionality whereby one administrative LU is preferred over other administrative LUs, when the host hypervisor binds a subsidiary LU to prepare a VM (Virtual Machine) disk. Also, the current storage system does not have a functionality to migrate a rebinded subsidiary LU to some other administrative LU to rebalance performance of physical resources in the storage system, since the host hypervisor does not know how much usage of the storage internal resource for the subsidiary LU.

BRIEF SUMMARY OF THE INVENTION

Exemplary embodiments of the invention provide subsidiary volume management. When a storage system receives an unbind command from a hypervisor, the storage system calculates the storage performance for each subsidiary LU, and then rebinds it to another administrative LU and migrates data from the source pool to another pool, if needed to rebalance the storage workflow. When the storage system receives a bind command from the host hypervisor, the storage system notifies that that specific subsidiary LU is rebinded to another administrative LU based on performance metric of each of the LUs, and then retries to send the bind command to the rebinded administrative LU. The storage system decides which administrative LU has sufficient resource. The server administrator does not know which administrative LU has sufficient storage resource without understanding how much usage there is of the storage internal resource.

In accordance with an aspect of the present invention, a storage system comprises: a memory being operable to store information of a plurality of logical unit groups, each of the plurality of logical unit groups including information of an administrative logical unit (LU) and information of one or more subsidiary LUs to be accessed from a virtual machine on a computer; and a controller being operable to create or select an administrative LU and to inform the computer of the created or selected administrative LU according to evaluation of a subsidiary LU which relates to another administrative LU, when the controller receives a command from the computer to said another administrative LU.

In some embodiments, evaluation of the subsidiary LU comprises at least one of evaluating throughput of the subsidiary LU against a throughput threshold or evaluating IOPS (Input/Output Operations per Second) of the subsidiary LU against an IOPS threshold or evaluating capacity usage of the subsidiary LU against a remaining storage capacity available for allocation. Selecting an administrative LU comprises one of selecting the administrative LU from a same capacity pool to which said another administrative LU belongs, selecting the administrative LU from a different capacity pool which is different from the capacity pool to which said another administrative LU belongs, and selecting the administrative LU from a different storage system which is different from a storage system in which said another administrative LU is disposed.

In specific embodiments, the controller receives a bind command from the computer to bind the subsidiary LU to said another administrative LU, conducts evaluation of at least one of storage performance or capacity usage of the subsidiary LU for binding to said another administrative LU, and when the evaluation indicates at least one of insufficient capacity or inadequate performance in binding the subsidiary LU to said another administrative LU, creates or selects the administrative LU for binding the subsidiary LU to the created or selected administrative LU. The evaluation indicates at least one of insufficient capacity or inadequate performance in binding the subsidiary LU to said another administrative LU after a performance threshold for evaluating the storage performance has been updated.

Another aspect of the invention is directed to a controller in a storage system which includes a memory to store information of a plurality of logical unit groups, each of the plurality of logical unit groups including information of an administrative logical unit (LU) and information of one or more subsidiary LUs to be accessed from a virtual machine on a computer. The controller is operable to create or select an administrative LU and to inform the computer of the created or selected administrative LU according to evaluation of a subsidiary LU which relates to another administrative LU, when the controller receives a command from the computer to said another administrative LU.

Another aspect of this invention is directed to a non-transitory computer-readable storage medium storing a plurality of instructions for controlling a data processor to perform subsidiary logical unit (LU) management in a storage system which includes a memory to store information of a plurality of logical unit groups, each of the plurality of logical unit groups including information of an administrative LU and information of one or more subsidiary LUs to be accessed from a virtual machine on a computer. The plurality of instructions comprise instructions that cause the data processor to create or select an administrative LU and to inform the computer of the created or selected administrative LU according to evaluation of a subsidiary LU which relates to another administrative LU, when the controller receives a command from the computer to said another administrative LU.

In some embodiments, the plurality of instructions further comprise, for the evaluation of the subsidiary LU, instructions that cause the data processor to perform at least one of evaluating throughput of the subsidiary LU against a throughput threshold or evaluating IOPS (Input/Output Operations per Second) of the subsidiary LU against an IOPS threshold or evaluating capacity usage of the subsidiary LU against a remaining storage capacity available for allocation. The instructions to select an administrative LU comprise instructions that cause the data processor to select one of the administrative LU from a same capacity pool to which said another administrative LU belongs, the administrative LU from a different capacity pool which is different from the capacity pool to which said another administrative LU belongs, and the administrative LU from a different storage system which is different from a storage system in which said another administrative LU is disposed.

In specific embodiments, the instructions that cause the data processor to create or select an administrative LU comprise: instructions that cause the data processor to receive a bind command from the computer to bind the subsidiary LU to said another administrative LU; instructions that cause the data processor to conduct evaluation of at least one of storage performance or capacity usage of the subsidiary LU for binding to said another administrative LU; and instructions that cause the data processor, when the evaluation indicates at least one of insufficient capacity or inadequate performance in binding the subsidiary LU to said another administrative LU, to create or select the administrative LU for binding the subsidiary LU to the created or selected administrative LU.

These and other features and advantages of the present invention will become apparent to those of ordinary skill in the art in view of the following detailed description of the specific embodiments.

DETAILED DESCRIPTION OF THE INVENTION

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transitory medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for subsidiary volume management.

Figure 1:
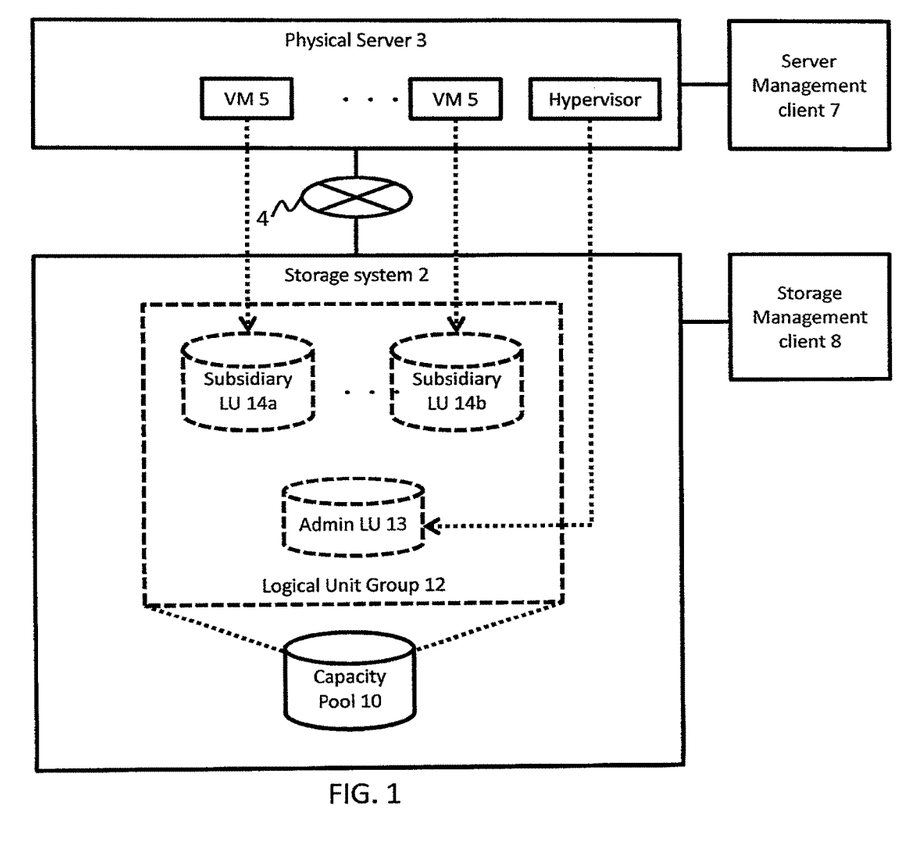
FIG. 1 illustrates an example of a hardware configuration of a computer system in which the method and apparatus of the invention may be applied.

FIG. 1 illustrates an example of a hardware configuration of a computer system in which the method and apparatus of the invention may be applied. The computer system includes storage system 2, physical server 3, and network 4. The physical server 3 is coupled with a server management client 7. The storage system is coupled with a storage management client 8. The physical server 3 includes a plurality of virtual machines (VM) 5. The storage system 2 includes a plurality of capacity pools 10 each of which has conventional Logical Units or Logical Unit Groups 12. The Logical Unit Groups 12 each include an Administrative LU 13 and zero or a plurality of Subsidiary LUs 14 (14a, 14b, etc.). The Administrative LU 13 controls the corresponding LU Group 12 to configure, create, delete, or migrate the plurality of subsidiary LU 14. The Hypervisor issues a management command to the administrative LU to create, delete, or migrate (bind) subsidiary LU. Each Subsidiary LU 14 has a disk image of a VM 5, respectively.

Figure 2:
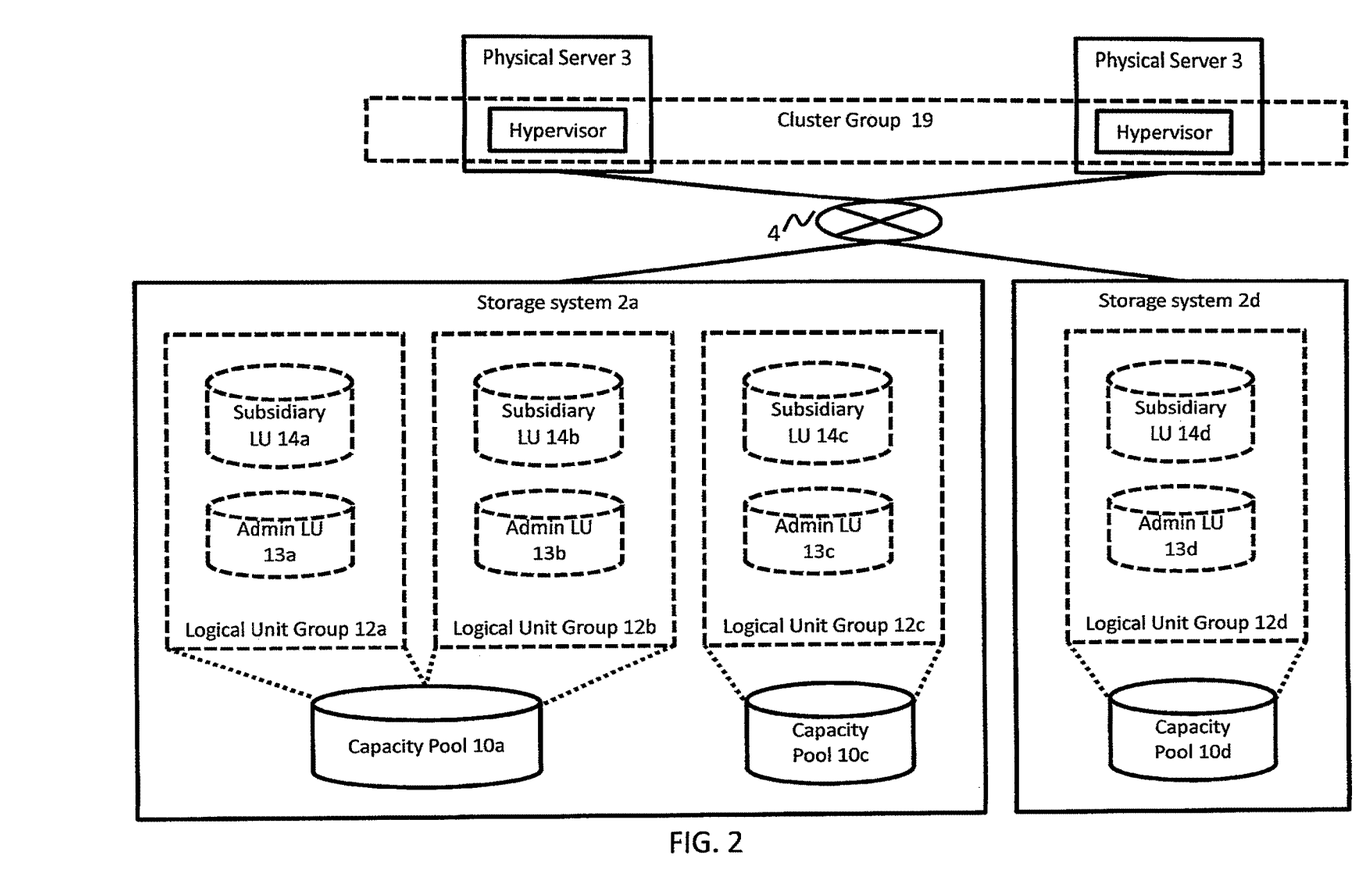
FIG. 2 shows another example of the computer system having a plurality of physical servers and a plurality of storage systems.

FIG. 2 shows another example of the computer system having a plurality of physical servers and a plurality of storage systems. In this example, the storage system 2a has multiple capacity pools 10a, 10c and multiple LU Groups 12a, 12b, 12c, and the storage system 2b has one capacity pool 10d and one LU group 12d. LU groups 12a and 12b use capacity pool 10a. LU group 12c uses capacity pol 10c. LU group 12d uses capacity pool 10d. A hypervisor of a physical server manages one or multiple LU Groups. Multiple hypervisors of multiple physical servers form a cluster group. Multiple hypervisors of the same cluster group manage one LU Group to create, delete, or migrate its subsidiary LUs. In this example, the Cluster Group 19 is the area of VM mobility from one hypervisor of a physical server to other hypervisor(s) of another physical server in the cluster group.

Figure 3A:
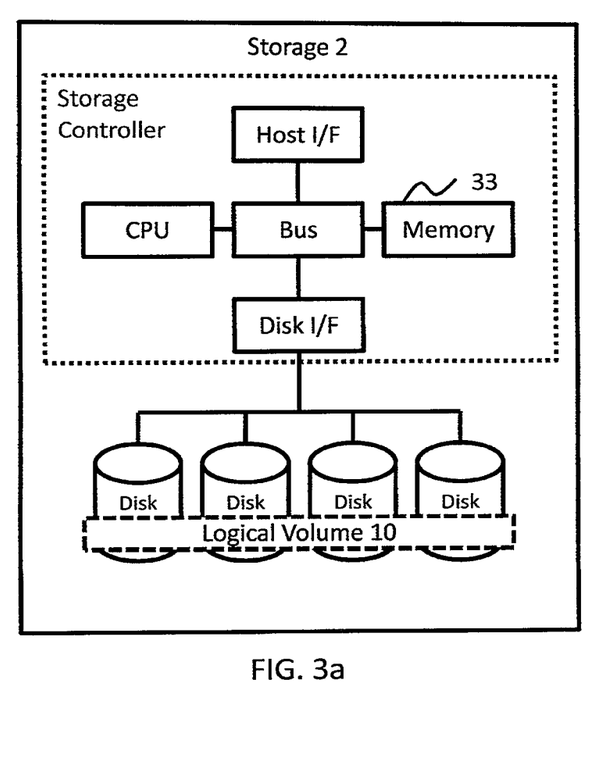
FIG. 3a shows an example of a storage system.

FIG. 3a shows an example of a storage system. The physical storage system 2 includes a host I/F which connects to a host, CPU, Memory, Disk I/F which connects to HDDs forming logical volume 10. In the storage controller, the host I/F, CPU, Memory, and Disk I/F are connected with each other by Bus I/F such as PCI, DDR, SCSI, or the like.

Figure 3B:
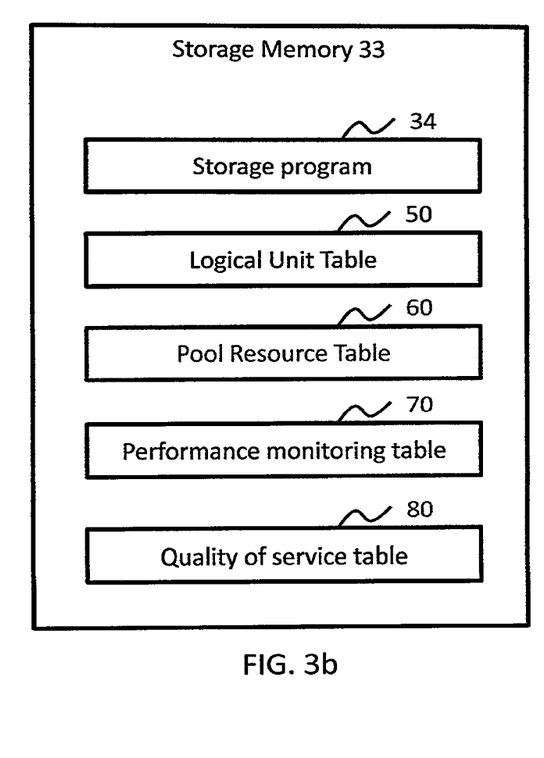
FIG. 3b shows an example of a storage memory.

FIG. 3b shows an example of a storage memory. The storage memory 33 includes storage program 34, Logical Unit table 50 (FIG. 5), pool resource table 60 (FIG. 6), performance monitoring table 70 (FIG. 7), and quality of service table 80 (FIG. 8).

Figure 4A:
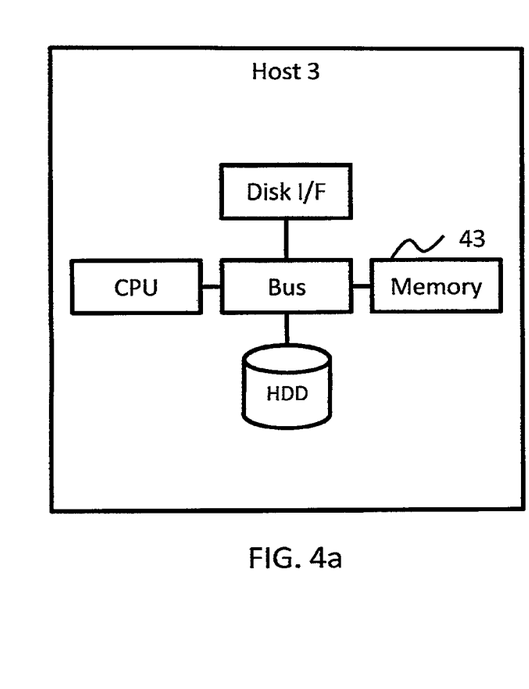
FIG. 4a shows an example of a host server (physical server).

FIG. 4a shows an example of a host server (physical server). The physical host 3 includes CPU, Memory, Disk I/F which connects to the storage system, and HDDs. The CPU, Memory, Disk I/F, and HDDs are connected with each other by Bus I/F such as PCI, DDR, SCSI, or the like.

Figure 4B:
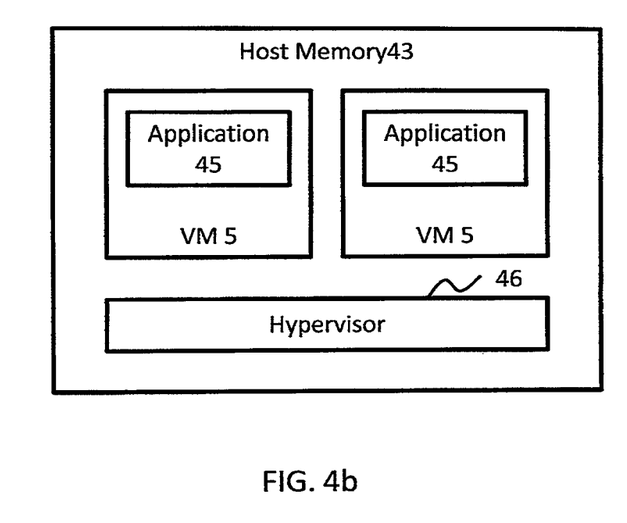
FIG. 4b shows an example of the host memory.

FIG. 4b shows an example of the host memory. The host memory 43 includes virtual machines (VMs) 5, application software 45, and virtual machine manager (VMM) or hypervisor 46.

Figure 5:
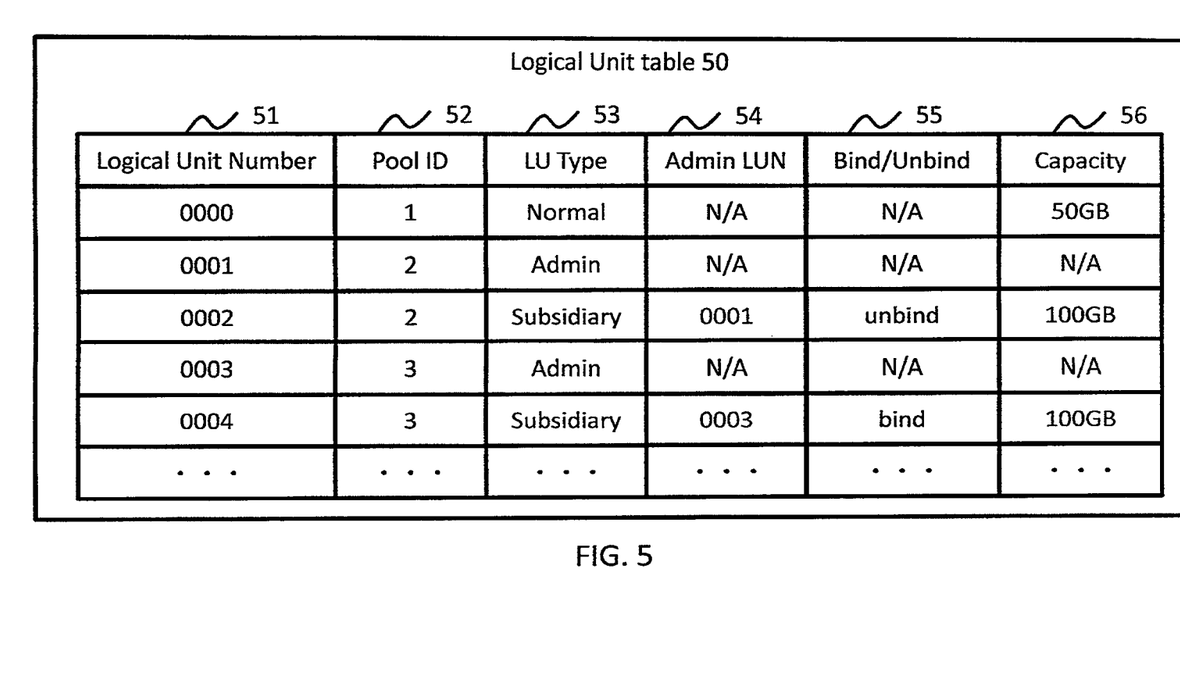
FIG. 5 shows an example of a Logical Unit table.

FIG. 5 shows an example of a Logical Unit table. The LU table 50 has Logical Unit number field 51, Pool ID field 52, LU type field 53, Administrative LU Number field 54, Bind/unbind type field 55, and Capacity field 56. The Logical Unit number field 51 has identification number of Logical Unit 11. The Pool ID field 52 identifies data pool for applying thin provisioning volume. The LU type field 53 shows the kind of LU type which may be Normal LU, administrative LU, or Subsidiary LU. The Administrative LUN field 54 has reference of LUN 51. This field is valid when the LU type 53 is Subsidiary LU. The administrative LUN controls the subsidiary LU. The Bind/Unbind type field 55 shows current status of Bind or Unbind. This field is valid when the LU type 53 is Subsidiary LU. When the field 55 is Bind, the host VM can have access IO to the Subsidiary LU (which cannot be moved to another LU Group). When the field 55 is Unbind, the host VM does not have access IO to the Subsidiary LU (which can be moved to another LU Group). When the host hypervisor issues a bind or unbind command for a Subsidiary LU to an Administrative LU, the Subsidiary LU changes state and the host VM has access IO to the subsidiary LU. If the storage system fails to bind due to insufficient resource (e.g., insufficient remaining capacity for allocation) or poor/inadequate performance (e.g., performance below a preset performance threshold), the storage system returns the bind response with failure status. The Capacity field 56 shows allocation capacity from capacity pool 10 of the normal LU or the subsidiary LU.

Figure 6:
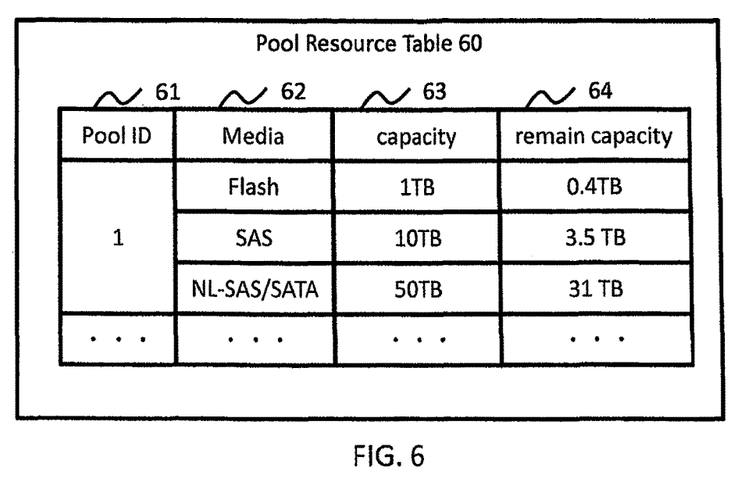
FIG. 6 shows an example of a pool resource table.

FIG. 6 shows an example of a pool resource table. The pool resource table 60 has pool ID field 61, media type field 62 (e.g., Flash, SAS, NL-SAS/SATA), physical capacity field 63, and remaining capacity field 64. The media type field 62 contains media type in the capacity pool. The physical capacity field 63 shows physical media capacity for each media type. The remaining capacity field 64 shows remaining physical media capacity which can be allocated to new volume or new write data segment for thin provisioning.

Figure 7:
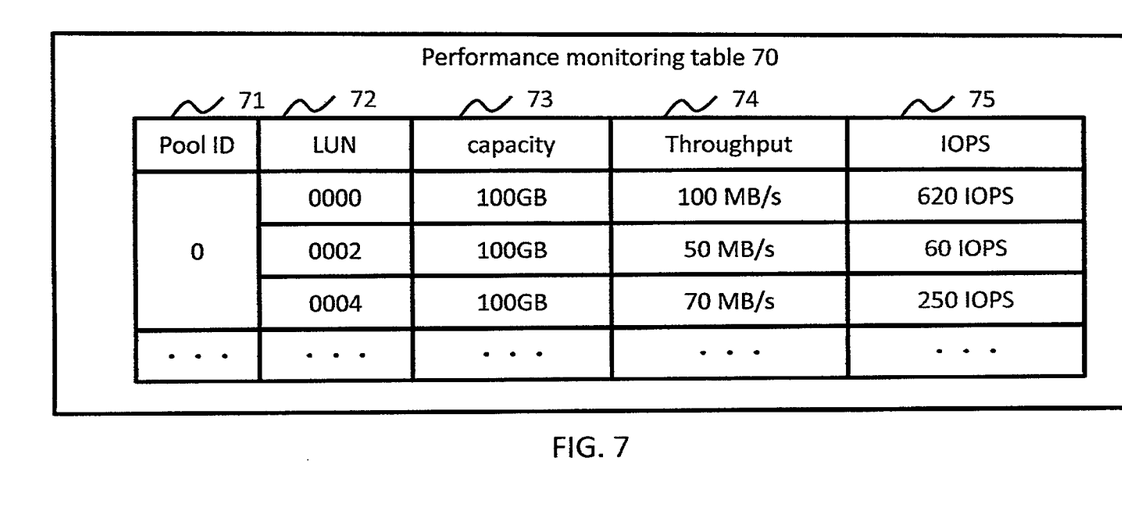
FIG. 7 shows an example of a performance monitoring table.
Figure 8:
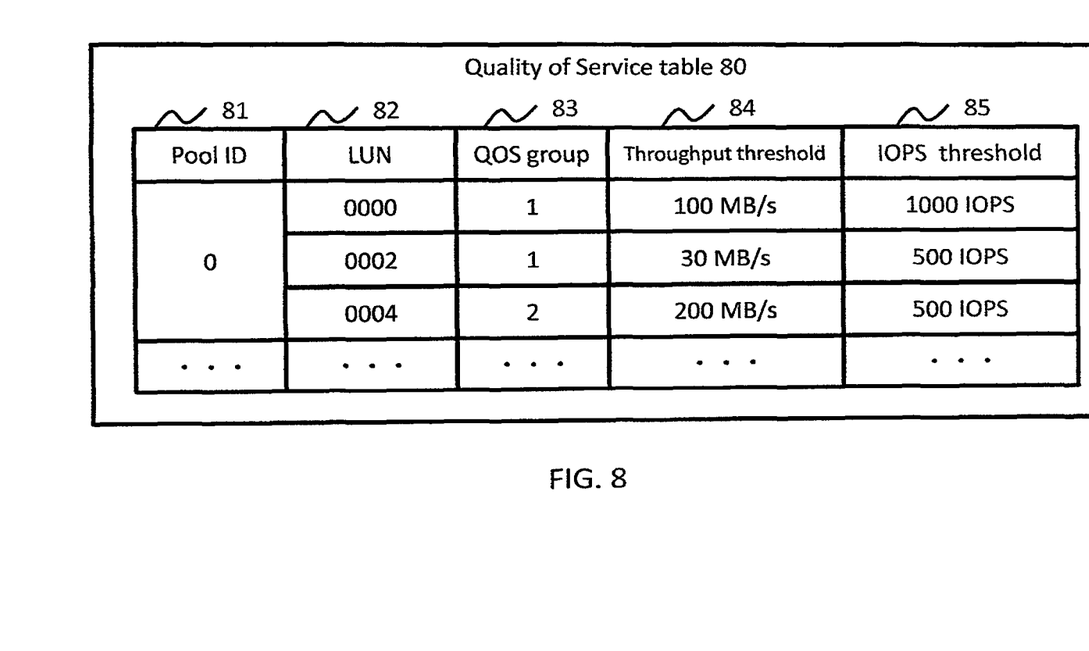
FIG. 8 shows an example of a quality of service table.

FIG. 7 shows an example of a performance monitoring table. The performance monitoring table 70 has pool ID field 71, LUN field 72, capacity usage field 73, throughput field 74, and IOPS (Input/Output Operations per Second) field 74. The table describes capacity usage, transaction measurement value, and/or throughput performance measurement value, which are calculated by the storage program 34. The administrative LU is control LU for the subsidiary LU and it does not have valid capacity, so that the table excludes the administrative LU.

FIG. 8 shows an example of a quality of service table. The quality of service table 80 has pool ID field 81, LUN field 82, QoS group field 83, throughput threshold field 84, and IOPS threshold field 85. This table describes host QoS group and performance threshold, which are used in monitoring storage performance. The administrative LU is control LU for the subsidiary LU and it does not have valid capacity, so that the table excludes the administrative LU. The QoS group field 83 is hypervisor cluster group of one or multiple physical host groups. The throughput threshold field 84 and Iops threshold field 85 are threshold values of guaranteed LU performance. The storage system gets the QoS group 83 and performance threshold (throughput threshold 84 and/or IOPS threshold 85) from the server management client 7.

Figure 9:
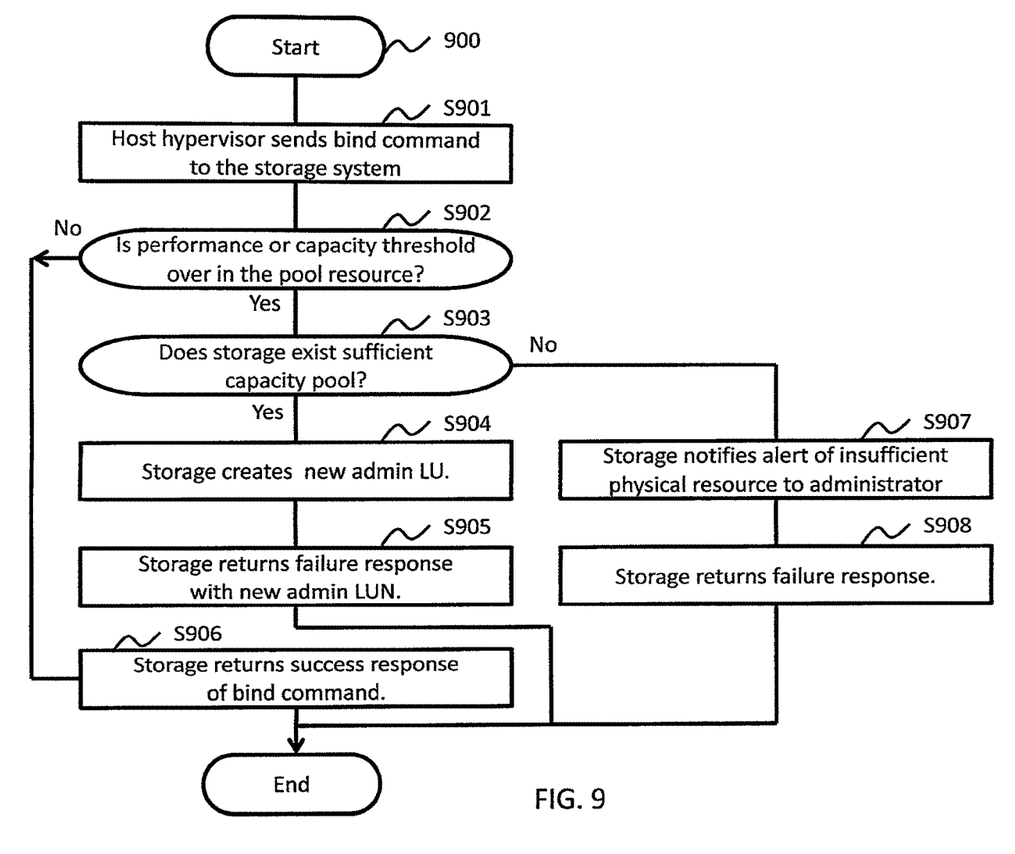
FIG. 9 shows an example of a flow diagram illustrating a process for creating administrative LU and binding subsidiary LU.

FIG. 9 shows an example of a flow diagram 900 illustrating a process for creating administrative LU and binding subsidiary LU. In step S901, the server administrator controls to power-on VM or deploy VM. The host hypervisor sends a bind command to the storage system. In step S902, the storage program 34 measures performance and updates the performance monitoring or measurement table 70. The storage program checks whether the current performance is above the performance threshold (throughput threshold 84 and/or IOPS threshold 85) in the QoS table 80, whether the high performance pool resource such as flash media tier which is described in the pool resource table 60 is insufficient, and/or whether the allocation capacity of thin provisioning will be higher than the physical capacity in the capacity pool which is described in the pool resource table 60. If performance or capacity issue is detected (Yes), the next step is S903. If No, the next step is S906.

In step S903, the storage program refers to the pool resource table 60. The storage program chooses pool volume based on sufficient performance as indicated by the remaining capacity of the higher performance tier media or total remaining physical capacity in the pool. If the storage system has sufficient resource (YES), the next step is S904. If No, the next step is S907. In step S904, the storage program creates a new administrative LU, since the storage program detects that no administrative LU has sufficient resource in S902. In step S905, the storage program returns a failure response with the new administrative LUN created in S904 as another candidate administrator LU to be rebinded. The host hypervisor will retry to bind to said another candidate administrative LU.

In step S906, the storage program returns a success response of bind command from host hypervisor.

In step S907, the storage program notifies alert of insufficient physical resource in the storage system to the storage administrator. In step S908, the storage program returns a failure response with a lack of administrative LU due to insufficient internal resources.

Figure 10:
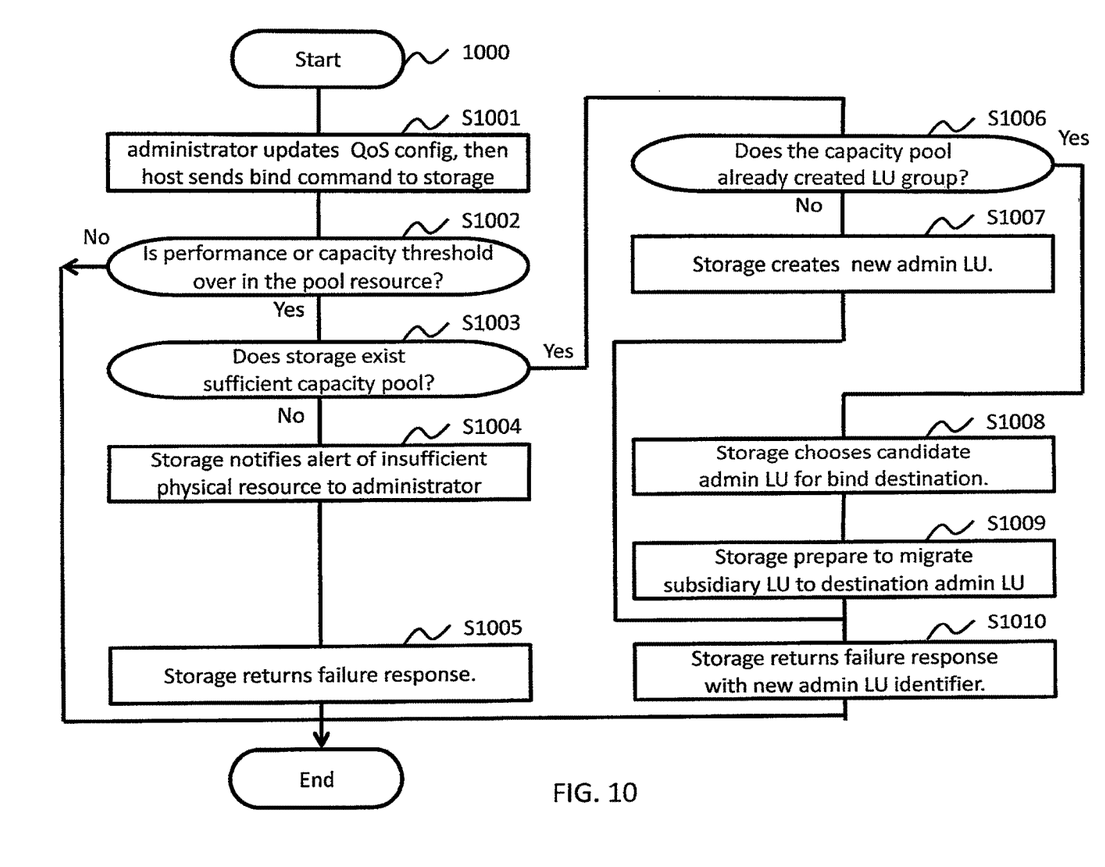
FIG. 10 shows an example of a flow diagram illustrating a process for updating QoS configuration from the server administrator and operation of migrating (rebinding) a subsidiary LU.

FIG. 10 shows an example of a flow diagram 1000 illustrating a process for updating QoS configuration from the server administrator and operation of migrating (rebinding) a subsidiary LU. In step S1001, the server administrator updates the QoS configuration, and the host or server hypervisor sends a bind command to the storage system since the server hypervisor detects performance issue due to performance threshold and the hypervisor issues the bind command to migrate the subsidiary LU to another administrative LU. In step S1002, the storage program measures performance and updates the performance monitoring table 70. The storage program checks whether the current performance is above the performance threshold (throughput threshold 84 and/or IOPS threshold 85) in the QoS table 80, whether the high performance pool resource such as flash media tier which is described in the pool resource table is insufficient, and/or whether the allocation capacity of thin provisioning will be higher than the physical capacity in the capacity pool which is described in the pool resource table 60. If performance or capacity issue is detected (Yes), next step is S1003. If No, the process ends.

In step S1003, the storage program refers to the pool resource table 60. The storage program chooses a pool volume based on sufficient performance as indicated by the remaining capacity of the higher performance tier media or total remaining physical capacity in the pool. If the storage system has sufficient resource (YES), the next step is S1006. If No, the next step is S1005. In step S1004, the storage program notifies alert of insufficient physical resource in the storage system to the storage administrator. In step S1005, the storage program returns a failure response with a lack of administrative LU due to insufficient internal resources.

In step S1006, the storage program refers to the logical unit table 50. If the capacity pool which is chosen in step S1003 has one or multiple LU Groups (YES), the next step is S1008. If No, the next step is S1007. In step S1007, the storage program creates a new administrative LU, and the next step is S1010. In step S1008, the storage program chooses a candidate administrative LU for bind destination based on the pool resource table 60. In step S1009, the storage system prepares to migrate data of the subsidiary LU to the destination administrative LU which was chosen in step S1008. In step S1010, the storage program returns a failure response with the new administrative LUN created in S1007 or the candidate administrative LUN chosen in step S1008 as another candidate administrator LU to be rebinded. The host hypervisor will retry to bind to said another candidate administrative LU.

Figure 11:
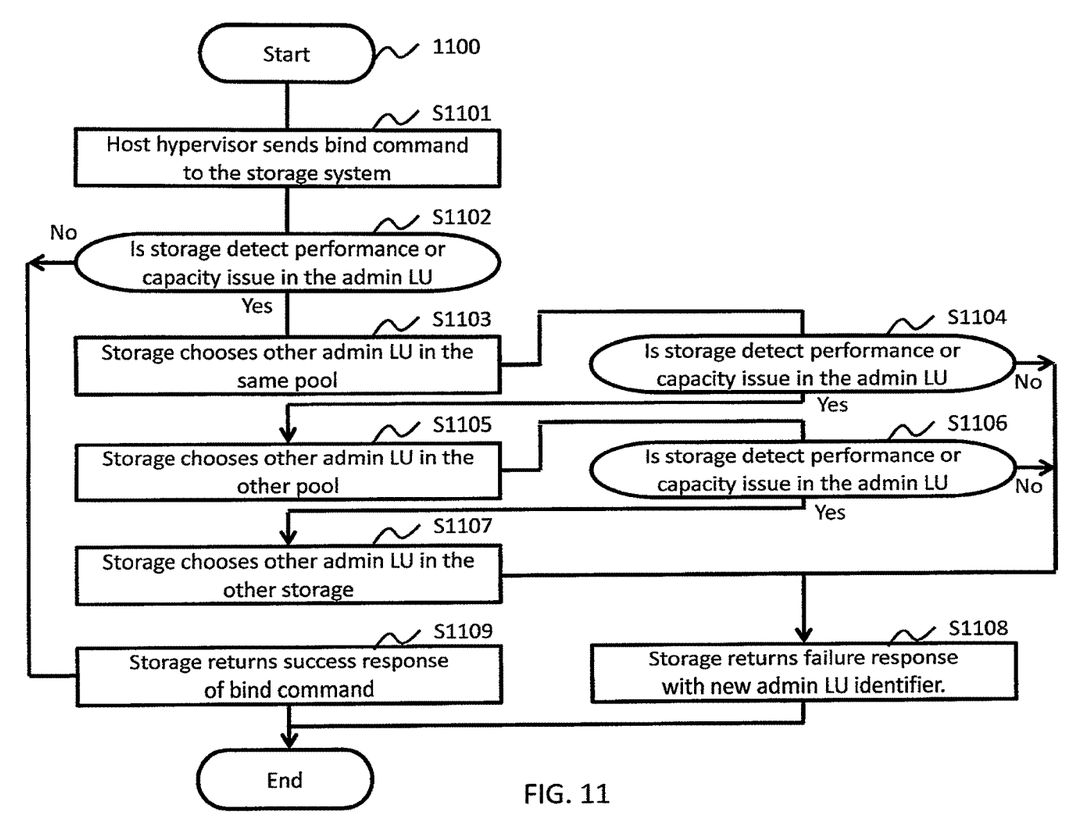
FIG. 11 shows an example of a flow diagram illustrating a process for subsidiary LU migration to another pool or another storage system.

FIG. 11 shows an example of a flow diagram 1100 illustrating a process for subsidiary LU migration to another pool or another storage system. In step S1101, the server administrator controls to power-on VM or deploy VM. The host hypervisor sends a bind command to the storage system. In step S1102, the storage program refers to the performance monitoring or measurement table 70 to detect any performance or capacity issue in the administrative LU. If Yes, the next step is S1103. If No, the next step is S1109.

In step S1103, the storage program chooses another administrative LU in the same pool. In step S1104, the storage program refers to the performance monitoring table 70 to detect any performance or capacity issue in the administrative LU. If Yes, the next step is S1105. If No, next step is S1108. In step S1105, the storage program chooses another administrative LU in another pool. In step S1106, the storage program refers to the performance monitoring table 70 to detect any performance or capacity issue in the administrative LU. If Yes, the next step is S1107. If No, the next step is S1108. In step S1107, the storage system chooses another administrative LU in another storage system. In step S1108, the storage program returns a failure response with a new administrative LUN chosen in step S1103, S1105, or S1107, as another candidate administrator LU to be rebinded. The host hypervisor will retry to bind to said another candidate administrative LU. In step S1109, the storage program returns a success response of the bind command from host hypervisor.

Of course, the system configurations illustrated in FIGS. 1 and 2 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for subsidiary volume management. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage system comprising:
a memory being operable to store information of a plurality of logical unit groups, each of the plurality of logical unit groups including an administrative logical unit (LU) and one or more subsidiary LUs to be accessed from a virtual machine on a computer; and
a controller being operable to create or select an administrative LU, upon receiving a bind command from the computer to bind a subsidiary LU to another administrative LU, according to evaluation of binding the subsidiary LU to said another administrative LU, to bind the subsidiary LU to the created or selected administrative LU instead, to move the subsidiary LU to the logical unit group to which the created or selected administrative LU belongs, and to inform the computer of binding the subsidiary LU to the created or selected administrative LU;
wherein binding the subsidiary LU to the created or selected administrative LU does not permit the subsidiary LU to be moved from the logical unit group to which the created or selected administrative LU belongs without unbinding the subsidiary LU from the created or selected administrative LU; and
wherein moving the subsidiary LU to the logical unit group to which the created or selected administrative LU belongs includes migrating data of the subsidiary LU to the logical unit group.

2. The storage system according to claim 1,
wherein evaluation of the subsidiary LU comprises at least one of evaluating throughput of the subsidiary LU against a throughput threshold or evaluating IOPS (Input/Output Operations per Second) of the subsidiary LU against an IOPS threshold or evaluating capacity usage of the subsidiary LU against a remaining storage capacity available for allocation.

3. The storage system according to claim 1,
wherein selecting an administrative LU comprises selecting the administrative LU from a same capacity pool to which said another administrative LU belongs.

4. The storage system according to claim 1,
wherein the controller receives the bind command from the computer to bind the subsidiary LU to said another administrative LU, conducts evaluation of at least one of storage performance or capacity usage of the subsidiary LU for binding to said another administrative LU, and when the evaluation indicates at least one of insufficient capacity or inadequate performance in binding the subsidiary LU to said another administrative LU, creates or selects the administrative LU for binding the subsidiary LU to the created or selected administrative LU.

5. The storage system according to claim 4,
wherein the evaluation indicates at least one of insufficient capacity or inadequate performance in binding the subsidiary LU to said another administrative LU after a performance threshold for evaluating the storage performance has been updated.

6. The storage system according to claim 1,
wherein selecting an administrative LU comprises selecting the administrative LU from a different capacity pool which is different from the capacity pool to which said another administrative LU belongs.

7. The storage system according to claim 1,
wherein selecting an administrative LU comprises selecting the administrative LU from a different storage system which is different from a storage system in which said another administrative LU is disposed.

8. A controller in a storage system which includes a memory to store information of a plurality of logical unit groups, each of the plurality of logical unit groups including an administrative logical unit (LU) and one or more subsidiary LUs to be accessed from a virtual machine on a computer, the controller being operable:
to create or select an administrative LU, upon receiving a bind command from the computer to bind a subsidiary LU to another administrative LU, according to evaluation of binding the subsidiary LU to said another administrative LU, to bind the subsidiary LU to the created or selected administrative LU instead, to move the subsidiary LU to the logical unit group to which the created or selected administrative LU belongs, and to inform the computer of binding the subsidiary LU to the created or selected administrative LU;
wherein binding the subsidiary LU to the created or selected administrative LU does not permit the subsidiary LU to be moved from the logical unit group to which the created or selected administrative LU belongs without unbinding the subsidiary LU from the created or selected administrative LU; and
wherein moving the subsidiary LU to the logical unit group to which the created or selected administrative LU belongs includes migrating data of the subsidiary LU to the logical unit group.

9. The controller according to claim 8,
wherein evaluation of the subsidiary LU comprises at least one of evaluating throughput of the subsidiary LU against a throughput threshold or evaluating IOPS (Input/Output Operations per Second) of the subsidiary LU against an IOPS threshold or evaluating capacity usage of the subsidiary LU against a remaining storage capacity available for allocation.

10. The controller according to claim 8,
wherein selecting an administrative LU comprises selecting the administrative LU from a same capacity pool to which said another administrative LU belongs.

11. The controller according to claim 8,
wherein the controller receives the bind command from the computer to bind the subsidiary LU to said another administrative LU, conducts evaluation of at least one of storage performance or capacity usage of the subsidiary LU for binding to said another administrative LU, and when the evaluation indicates at least one of insufficient capacity or inadequate performance in binding the subsidiary LU to said another administrative LU, creates or selects the administrative LU for binding the subsidiary LU to the created or selected administrative LU.

12. The controller according to claim 11,
wherein the evaluation indicates at least one of insufficient capacity or inadequate performance in binding the subsidiary LU to said another administrative LU after a performance threshold for evaluating the storage performance has been updated.

13. The controller according to claim 8,
wherein selecting an administrative LU comprises one of selecting the administrative LU from a different capacity pool which is different from the capacity pool to which said another administrative LU belongs, and selecting the administrative LU from a different storage system which is different from a storage system in which said another administrative LU is disposed.

14. A non-transitory computer-readable storage medium storing a plurality of instructions for controlling a data processor to perform subsidiary logical unit (LU) management in a storage system which includes a memory to store information of a plurality of logical unit groups, each of the plurality of logical unit groups including information of an administrative LU and information of one or more subsidiary LUs to be accessed from a virtual machine on a computer, the plurality of instructions comprising:
 instructions that cause the data processor to create or select an administrative LU, upon receiving a bind command from the computer to bind a subsidiary LU to another administrative LU, according to evaluation of binding the subsidiary LU to said another administrative LU, to bind the subsidiary LU to the created or selected administrative LU instead, to move the subsidiary LU to the logical unit group to which the created or selected administrative LU belongs, and to inform the computer of binding the subsidiary LU to the created or selected administrative LU;
 wherein binding the subsidiary LU to the created or selected administrative LU does not permit the subsidiary LU to be moved from the logical unit group to which the created or selected administrative LU belongs without unbinding the subsidiary LU from the created or selected administrative LU; and
 wherein moving the subsidiary LU to the logical unit group to which the created or selected administrative LU belongs includes migrating data of the subsidiary LU to the logical unit group.

15. The non-transitory computer-readable storage medium according to claim 14, wherein the plurality of instructions further comprise, for the evaluation of the subsidiary LU:
 instructions that cause the data processor to perform at least one of evaluating throughput of the subsidiary LU against a throughput threshold or evaluating IOPS (Input/Output Operations per Second) of the subsidiary LU against an IOPS threshold or evaluating capacity usage of the subsidiary LU against a remaining storage capacity available for allocation.

16. The non-transitory computer-readable storage medium according to claim 14, wherein the instructions to select an administrative LU comprise:
 instructions that cause the data processor to select the administrative LU from a same capacity pool to which said another administrative LU belongs.

17. The non-transitory computer-readable storage medium according to claim 14, wherein the instructions that cause the data processor to create or select an administrative LU comprise:
 instructions that cause the data processor to receive the bind command from the computer to bind the subsidiary LU to said another administrative LU;
 instructions that cause the data processor to conduct evaluation of at least one of storage performance or capacity usage of the subsidiary LU for binding to said another administrative LU; and
 instructions that cause the data processor, when the evaluation indicates at least one of insufficient capacity or inadequate performance in binding the subsidiary LU to said another administrative LU, to create or select the administrative LU for binding the subsidiary LU to the created or selected administrative LU.

18. The non-transitory computer-readable storage medium according to claim 17,
wherein the evaluation indicates at least one of insufficient capacity or inadequate performance in binding the subsidiary LU to said another administrative LU after a performance threshold for evaluating the storage performance has been updated.

19. The non-transitory computer-readable storage medium according to claim 14, wherein the instructions to select an administrative LU comprise one of:
 instructions that cause the data processor to select the administrative LU from a different capacity pool which is different from the capacity pool to which said another administrative LU belongs, and instructions that cause the data processor to select the administrative LU from a different storage system which is different from a storage system in which said another administrative LU is disposed.

* * * * *